(12) United States Patent
Eromaki

(10) Patent No.: US 11,307,421 B2
(45) Date of Patent: Apr. 19, 2022

(54) DUAL MODE HEADSET

(71) Applicant: Huawei Technologies Co., Ltd., Shenzhen (CN)

(72) Inventor: Marko Eromaki, Tampere (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 16/628,150

(22) PCT Filed: Jul. 13, 2017

(86) PCT No.: PCT/EP2017/067743
§ 371 (c)(1),
(2) Date: Jan. 2, 2020

(87) PCT Pub. No.: WO2019/011436
PCT Pub. Date: Jan. 17, 2019

(65) Prior Publication Data
US 2020/0133010 A1    Apr. 30, 2020

(51) Int. Cl.
*G02B 27/01* (2006.01)
*G06F 1/16* (2006.01)

(52) U.S. Cl.
CPC ..... *G02B 27/0176* (2013.01); *G02B 27/0101* (2013.01); *G02B 2027/011* (2013.01); *G02B 2027/0156* (2013.01); *G06F 1/163* (2013.01)

(58) Field of Classification Search
CPC .... G02B 27/01–0189; G02B 2027/0105–0198
See application file for complete search history.

(56) References Cited

U.S. PATENT DOCUMENTS

2005/0264502 A1    12/2005  Sprague et al.
2010/0208200 A1    8/2010   Levis et al.
(Continued)

FOREIGN PATENT DOCUMENTS

CN    203225084 U    10/2013
CN    104865705 A    8/2015
(Continued)

OTHER PUBLICATIONS

Keynejad, S., "Make your own DIY HoloLens, AR display for under £20 | Polylens," Mar. 7, 2016, 2 pages. Retrieved from https://www.youtube.com/watch?v=MHFPOKyDUcg.
(Continued)

*Primary Examiner* — Michelle M Iacoletti
*Assistant Examiner* — Christopher A Lamb, II
(74) *Attorney, Agent, or Firm* — Conley Rose, P.C.

(57) ABSTRACT

A dual mode virtual reality (VR) and augmented reality (AR) headset includes a head-attachment, a main frame coupled to the head-attachment, and a pivot frame. The pivot frame includes a holder configured to accommodate an electronic device having a display screen, and a reflective screen configured to reflect content shown on the display screen. The pivot frame pivotally coupled to the main frame. In the first pivot frame position, the reflective screen at least partially intersects a field of view (α) of a user wearing the headset, and in the second pivot frame position the display screen at least partially intersects the α when the electronic device is accommodated in the holder.

19 Claims, 5 Drawing Sheets

(56) References Cited

U.S. PATENT DOCUMENTS

| | | | |
|---|---|---|---|
| 2014/0184775 A1 | 7/2014 | Drake et al. | |
| 2014/0362113 A1 | 12/2014 | Benson et al. | |
| 2015/0260993 A1 | 9/2015 | Bickerstaff et al. | |
| 2016/0116748 A1* | 4/2016 | Carollo | G02B 27/0172 345/8 |
| 2016/0189432 A1 | 6/2016 | Bar-Zeev et al. | |
| 2016/0349509 A1* | 12/2016 | Lanier | G06F 3/011 |
| 2017/0045746 A1* | 2/2017 | Ellsworth | G02C 9/02 |
| 2017/0102546 A1 | 4/2017 | Tempel et al. | |
| 2019/0379868 A1 | 12/2019 | Lin et al. | |

FOREIGN PATENT DOCUMENTS

| | | |
|---|---|---|
| CN | 104903818 A | 9/2015 |
| CN | 205003394 U | 1/2016 |
| CN | 105455945 A | 4/2016 |
| CN | 205246971 U | 5/2016 |
| CN | 205374847 U | 7/2016 |
| CN | 205374874 U | 7/2016 |
| CN | 205485059 U | 8/2016 |
| CN | 105929554 A | 9/2016 |
| CN | 205787385 U | 12/2016 |
| CN | 106292382 A | 1/2017 |
| CN | 106526859 A | 3/2017 |
| CN | 206115040 U | 4/2017 |
| CN | 106707518 A | 5/2017 |
| CN | 106773067 A | 5/2017 |
| CN | 206193349 U | 5/2017 |
| CN | 106842573 A | 6/2017 |
| EP | 0627850 A1 | 12/1994 |
| EP | 2237098 A1 | 10/2010 |
| JP | 2008304881 A | 12/2008 |
| WO | 2016067183 A1 | 5/2016 |
| WO | 2016191049 A1 | 12/2016 |

OTHER PUBLICATIONS

Hybbi, H., "Make Your Own Augmented Reality Viewer DIY," Dec. 26, 2016, 1 page, Retrieved from https://www.youtube.com/watch?v=Dy_6et-XdsY.

Lei, C., et al., "Status and Trends of Virtual Reality in Foreign Countries," Competitive Intelligence, vol. 13, No. 2, Apr. 2017, 8 pages.

Zhong, Z., et al., "Summary of Virtual Reality Augmentation Technology," Science China Press, Dec. 16, 2014, 25 pages.

* cited by examiner

DUAL MODE HEADSET

CROSS-REFERENCE TO RELATED APPLICATIONS

This application is a U.S. National Stage application of International Patent Application No. PCT/EP2017/067743 filed on Jul. 13, 2017, which is hereby incorporated by reference in its entirety.

TECHNICAL FIELD

The disclosure relates to a dual mode headset comprising head-attachment means, a main frame connected to the head-attachment means, and a pivot frame pivotally connected to the main frame.

BACKGROUND

Reality headsets can be divided into two main groups, those to be used for augmented reality (AR) and those to be used for virtual reality (VR). VR headsets are adapted for a static experience by shutting out the surroundings, e.g. allowing the user to be completely submerged into a movie or a game. AR headsets, on the other hand, must allow the surroundings to be clearly visible, providing a dynamic experience by e.g. allowing the user to move around outdoors with unrestricted vision.

AR and VR headsets are expensive units suitable for only one kind of user experience, either a dynamic or a static user experience. A user wishing to use both AR and VR must invest in two separate units. Further, the complexity of current AR and VR headsets keeps the price level relatively high, which also limits the possibilities for developers to concept new applications without having to make significant investments in hardware.

Further, both AR and VR devices are oftentimes large and heavy units suitable only for a static user experience.

SUMMARY

It is an object to provide an improved headset.

The foregoing and other objects are achieved by the features of the independent claim. Further implementation forms are apparent from the dependent claims, the description, and the figures.

According to a first aspect, there is provided a dual mode VR and AR headset comprising head-attachment means, a main frame connected to the head-attachment means, and a pivot frame, the pivot frame comprising a holder configured to accommodate an electronic device having a display screen, and a reflective screen configured to reflect content shown on the display screen when the electronic device is accommodated in the holder, the pivot frame being pivotally connected to the main frame, allowing the pivot frame to be moved between a first pivot frame position and a second pivot frame position relative to the main frame, wherein in the first pivot frame position the reflective screen at least partially intersects a field of view of a user wearing the headset, and wherein in the second pivot frame position, and when the electronic device is accommodated in the holder, the display screen at least partially intersects the field of view. The costs associated with AR and VR headsets decrease significantly when one and the same headset can be used for both AR and VR purposes, since the user does not have to purchase two separate devices. The costs are reduced further by the possibility of using an existing electronic device for displaying the augmented or virtual reality. The user only needs to invest in a purely mechanical headset structure, which is far cheaper than a complete headset which includes electronics, batteries, displays, speakers, and so on. The dual mode VR and AR headset is in its AR mode in the first pivot frame position, and in its VR mode in the second pivot frame position.

Hence, a dual mode VR and AR headset is provided which is configured to accommodate an electronic device, thereby facilitating a smaller and cheaper headset which can be used for both AR and VR purposes.

In a possible implementation form of the first aspect, wherein the pivot frame is in the first pivot frame position, and when the electronic device is accommodated in the holder, the display screen does not intersect the field of view. With this arrangement, the visibility of the surroundings remains unaffected for delivering a true AR experience.

In a further possible implementation form of the first aspect, the headset further comprises corrective optics, the corrective optics being operably coupled to the pivot frame to move to a first position relative to the main frame when the pivot frame moves to the first pivot frame position, and to move to a second position relative to the main frame when the pivot frame moves to the second pivot frame position, allowing the corrective optics to be moved into, or out of, the field of view of the user, depending on whether the headset is to be used in AR mode or VR mode.

In a further possible implementation form of the first aspect, the corrective optics are adapted for at least partially intersecting a field of view of a user wearing the headset when the pivot frame is in the second pivot frame position, improving the visibility of the display screen for the user. I.e., the corrective optics may be used for focusing and/or magnifying the image displayed on the display screen when the headset is in the VR mode.

In a further possible implementation form of the first aspect, the headset does not need to comprise any corrective optics.

In a further possible implementation form of the first aspect, the pivot frame further comprises a first link, one end of the first link being fixedly connected to the holder, and an opposite end of the first link being pivotally connected to the main frame, providing reliable and uncomplicated mechanical means for pivoting the display screen and the reflective screen.

In a further possible implementation form of the first aspect, the first link extends from the holder at an acute angle, facilitating an upwards movement of the pivot frame such that the pivot frame and display screen can be moved out of the field of view of the user.

In a further possible implementation form of the first aspect, the reflective screen is at least partially curved, allowing the size of the image reflected on the reflective screen to be adapted.

In a further possible implementation form of the first aspect, the pivot frame further comprises a reflective element, the reflective element being adapted for reflecting light along at least an optical axis of a camera of the electronic device, when the electronic device is accommodated in the holder, allowing the headset, in conjunction with the camera of the electronic device, to be used for recording the surroundings.

In a further possible implementation form of the first aspect, at least one surface of the reflective element extends at an acute angle relative the holder, keeping the reflective element in a discrete position where it is more or less masked by the holder and the electronic device.

In a further possible implementation form of the first aspect, the corrective optics is fixedly connected to the reflective screen, providing the headset with a very simple and cost effective structure having as few components as possible.

In a further possible implementation form of the first aspect, the corrective optics extends from the reflective screen at an obtuse angle, allowing the corrective optics to be out of the field of view of the user during AR mode.

In a further possible implementation form of the first aspect, the corrective optics is pivotally connected to the main frame such that the corrective optics can be completely folded out of the way when not used, i.e. in AR mode.

In a further possible implementation form of the first aspect, the pivot frame further comprises a second link and a connecting rod, one end of the second link being fixedly connected to the first link, such that the first and second links together form a V-shape, the V-shape being open in a direction towards the holder, the opposite end of the second link being pivotally connected to one end of the connecting rod, and the opposite end of the connecting rod being pivotally connected to the corrective optics, facilitating reliable and uncomplicated mechanical means for pivoting the display screen, the reflective screen, and the corrective optics depending on mode to be used.

In a further possible implementation form of the first aspect, the main frame comprises a first main frame part, adapted for extending perpendicular to a face of a user, and a second main frame part, adapted for extending in parallel with the face of a user, the first link being pivotally connected to the second main frame part such that the pivot frame and the main frame take up as little space as possible around the head of the user.

In a further possible implementation form of the first aspect, the first pivot frame position comprises the display screen extending in parallel with the first main frame part, and the second pivot frame position comprises the display screen extending in parallel with the second main frame part, when the electronic device is accommodated in the holder, facilitating the display screen being securely folded away when not in use.

In a further possible implementation form of the first aspect, the first link is pivotally connected to the second main frame part at a location below the first main frame part when a user is wearing the headset, keeping the pivot point between the pivot frame and the main frame at a location which is lower than the major part of the main frame, allowing the pivot frame to be pivoted upwards to a position out or the way, above the main frame, when being used in AR mode.

In a further possible implementation form of the first aspect, the corrective optics is pivotally connected to the first main frame part at a distance from the second main frame part, allowing the corrective optics to be arranged at a location which is completely independent of the reflective screen.

In a further possible implementation form of the first aspect, the reflective screen extends from the holder at an acute angle, allowing the reflective screen to be securely tucked in between the electronic device and the face of the user, when in VR mode.

This and other aspects will be apparent from the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 1:
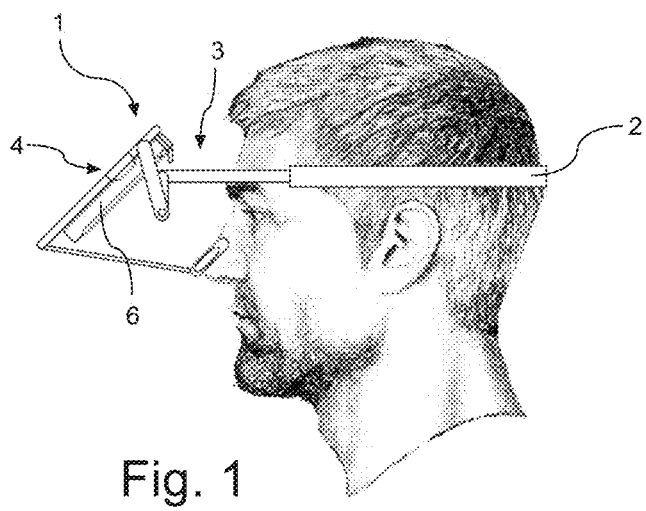
FIG. 1 shows a schematic side view of a dual mode headset in accordance with one embodiment of the present invention.

FIG. 1 shows a dual mode virtual reality (VR) and augmented reality (AR) headset 1 comprising head-attachment means 2, a main frame 3 and a pivot frame 4. The head-attachment means 2 may comprise a strap 2 extending around the user's head, along the sides. The strap 2 could be an adjustable, two-part e.g. plastic or leather side strap comprising locking means such as a buckle or a pin and several holes, or be a one-part elastic rubber side strap, expanding as much as necessary when pulled over and placed around the head of the user. The head-attachment means 2 could also be, or comprise in addition to the side strap, one or several top strap(s) for extending atop the user's head.

Figure 2A:
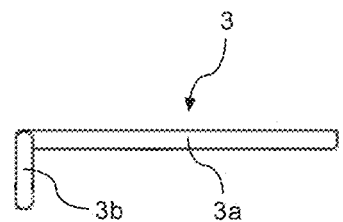
FIG. 2a shows a schematic side view of a main frame in accordance with one embodiment of the present invention.

The main frame 3, shown in more detail in FIG. 2a, is connected to the head-attachment means 2 such that the main frame 3 extends, partially or completely, in the front of the user's face when the headset is being worn by the user. The main frame 3 may comprise only a front piece, such as that of a pair of goggles, or may also be provided with temples, such as those of a pair of eyeglasses. Regardless, the main frame 3 is preferably adapted for resting on the nasopharynx of the user.

In one embodiment, the main frame 3 comprises a first main frame part 3a, extending perpendicular to the face of the user when the headset is being worn, and a second main frame part 3b, extending in parallel with the face of the user when the headset is being worn.

Figure 2B:
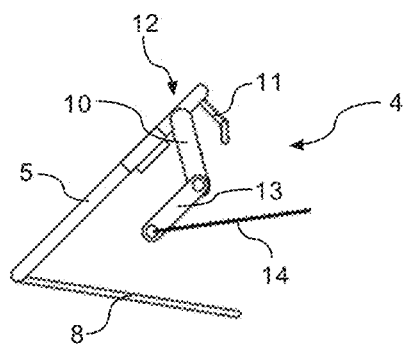
FIG. 2b shows a schematic side view of a pivot frame in accordance with one embodiment of the present invention.
Figure 2C:
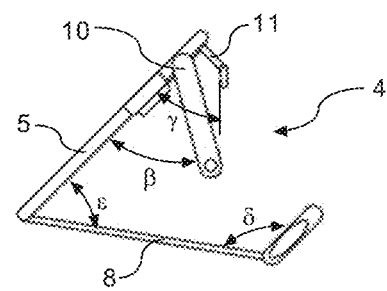
FIG. 2c shows a schematic side view of a pivot frame in accordance with another embodiment of the present invention.

The pivot frame 4, shown in more detail in FIGS. 2b and 2c, comprises at least a holder 5 and a reflective screen 8. The reflective screen 8 preferably extends from one side of the holder 5, at or near an edge of the holder 5, and at an acute angle c to the plane of the holder 5, see FIG. 2c.

The holder 5 is configured to accommodate an electronic device 6 having a display screen 7, e.g. a mobile phone (such as a smart phone), and the reflective screen 8 is configured to reflect any content shown on the display screen 7 when the electronic device 6 is accommodated in the holder 5.

The holder 5 may be a thin plate, abutting and supporting the back of the electronic device 6, the plate being provided with holding elements such as e.g. L-shaped brackets for releasably holding the electronic device 6. Further, the holder 5 may be a hollow frame, the frame extending at least partially around the peripheral edge of the electronic device such that the display screen 7 remains visibly uninhibited. Also, the holder 5 may comprise brackets or clamps accommodating, supporting, and interlocking with the electronic device 6 at a few specific locations along the edge of the electronic device 6.

The reflective screen 8 may be transparent or semi-transparent, and provided with a thin layer of metal such as silver or aluminum. Further, the screen 8 may be tinted in order to improve visibility under bright conditions. The reflective screen 8 may be at least partially curved, either having one single uniform curvature to reflect the entire display screen 7 area simultaneously for both eyes (two-dimensionally) or having two discrete curvatures to reflect half of the display screen 7 area to each eye (three-dimensionally).

The pivot frame 4 is pivotally connected to the main frame 3, allowing the pivot frame 4 to be moved between a first pivot frame position P1 and a second pivot frame position P2 relative to the main frame 3. I.e., the head-attachment means 2 and the main frame 3 remain in the same position on the head of the user, while the pivot frame 4 is being rotated.

Figure 4A:
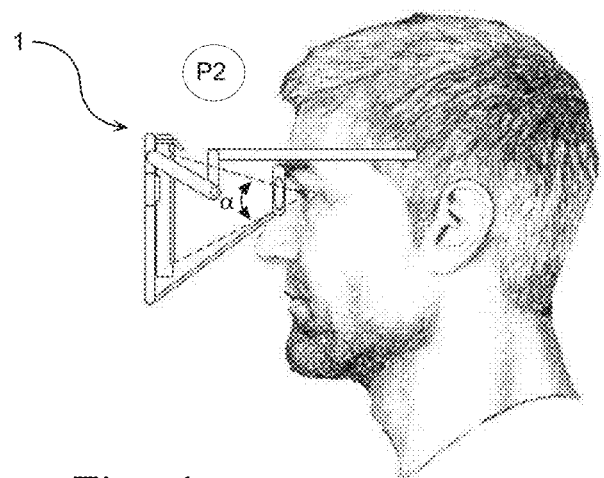
FIG. 4a shows a schematic side view of a dual mode headset in accordance with one embodiment of the present invention, wherein said headset is in VR mode.
Figure 4B:
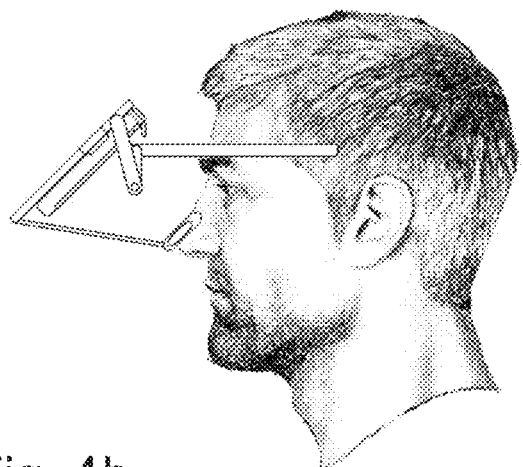
FIG. 4b shows the embodiment of FIG. 4a, wherein said headset is in a position between VR mode and AR mode.
Figure 4C:
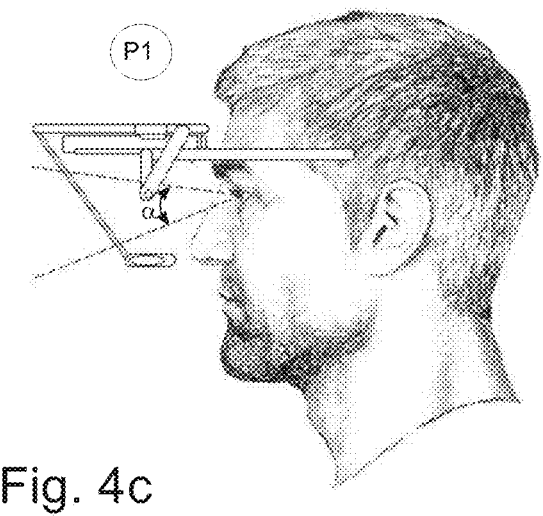
FIG. 4c shows the embodiment of FIGS. 4a and 4b, wherein said headset is in AR mode.
Figure 6A:
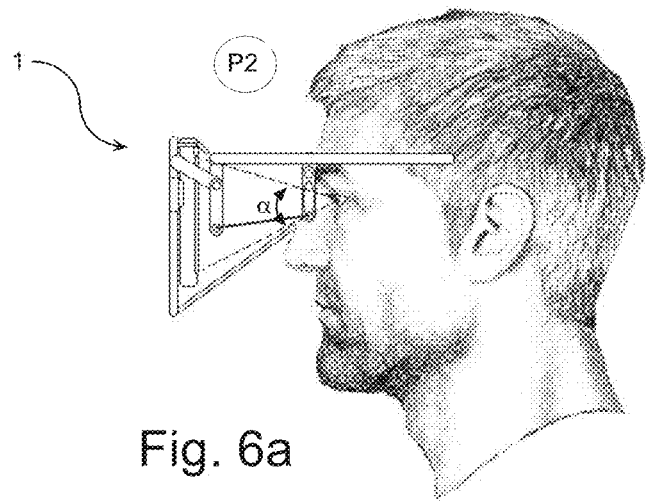
FIG. 6a shows a schematic side view of a dual mode headset in accordance with another embodiment of the present invention, wherein said headset is in VR mode.
Figure 6B:
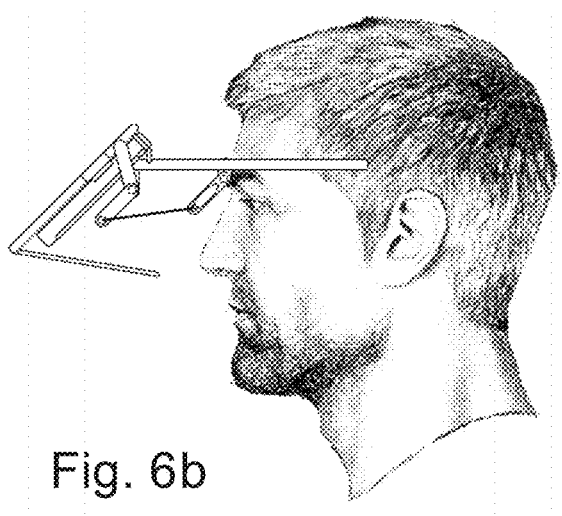
FIG. 6b shows the embodiment of FIG. 6a, wherein said headset is in a position between VR mode and AR mode.
Figure 6C:
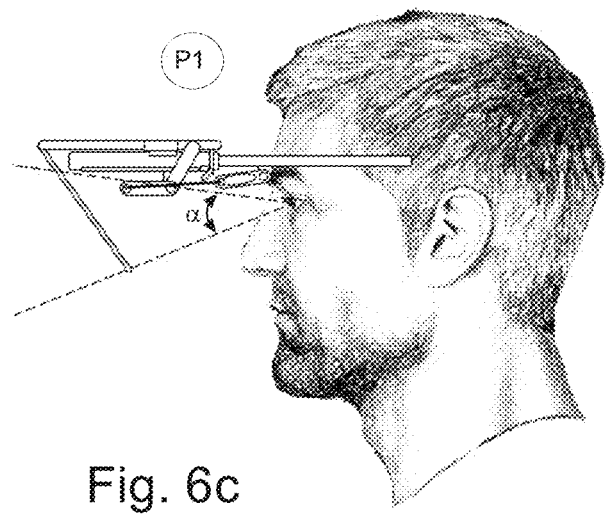
FIG. 6c shows the embodiment of FIGS. 6a and 6b, wherein said headset is in AR mode.

In the first pivot frame position P1, see FIGS. 4c and 6c, the reflective screen 8 at least partially intersects the field of view a of a user wearing the headset 1. In this pivot frame position P1, when the electronic device 6 is accommodated in the holder 5, the display screen 7 does not intersect the field of view a. This is the AR mode of the headset 1.

In the second pivot frame position P2, see FIGS. 4a and 6a, the display screen 7 at least partially intersects the field of view a of the user wearing the headset 1, when the electronic device 6 is accommodated in the holder 5. In one embodiment, the reflective screen 8 does not intersect the field of view a of the user when the pivot frame 4 is in this pivot frame position P2. This is the VR mode of the headset 1.

The headset 1 may further comprise corrective optics 9 adapted for at least partially intersecting the field of view a of a user wearing the headset 1 when the pivot frame 4 is in the second pivot frame position P2. I.e., the corrective optics 9 is to be arranged in the field of view a of the user when the headset 1 is in the VR mode, i.e. when the display screen 7 of an electronic device 6 accommodated in the holder 5 at least partially intersects the very same field of view a.

The corrective optics 9 may comprise of a pair of focusing or magnifying lenses. In such an embodiment, the corrective optics 9 are preferably not arranged in the field of view a of the user when the pivot frame 4 is in the first pivot frame position P1, i.e. when the headset 1 is in the AR mode. The corrective optics 9 would, in this case, focus or magnify the image displayed on the reflective screen 8 while blurring the surroundings. However, the surroundings need to be clearly and sharply visible to the user when the headset 1 is in the AR mode. Therefore the corrective optics 9 would typically only be used in the VR mode to focus the view on the user onto the display screen 7.

However, in a further embodiment, the headset 1 does not need to comprise corrective optics 9 at all.

The corrective optics 9 are arranged such that they are located between the face of the user and the display screen 7, when the headset is worn by the user and in VR mode. The corrective optics 9 are operably coupled to the pivot frame 4 to move to a first position C1 relative to the main frame 3 when the pivot frame 4 moves to the first pivot frame position P1, and to move to a second position C2 relative to the main frame 3 when the pivot frame 4 moves to the second pivot frame position P2. This will be described in more detail further below.

Figure 3:
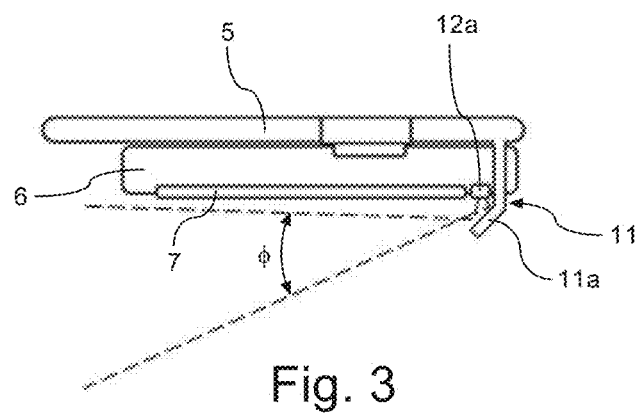
FIG. 3 shows a schematic side view of a holder and reflective element in accordance with one embodiment of the present invention.
Figure 5A:
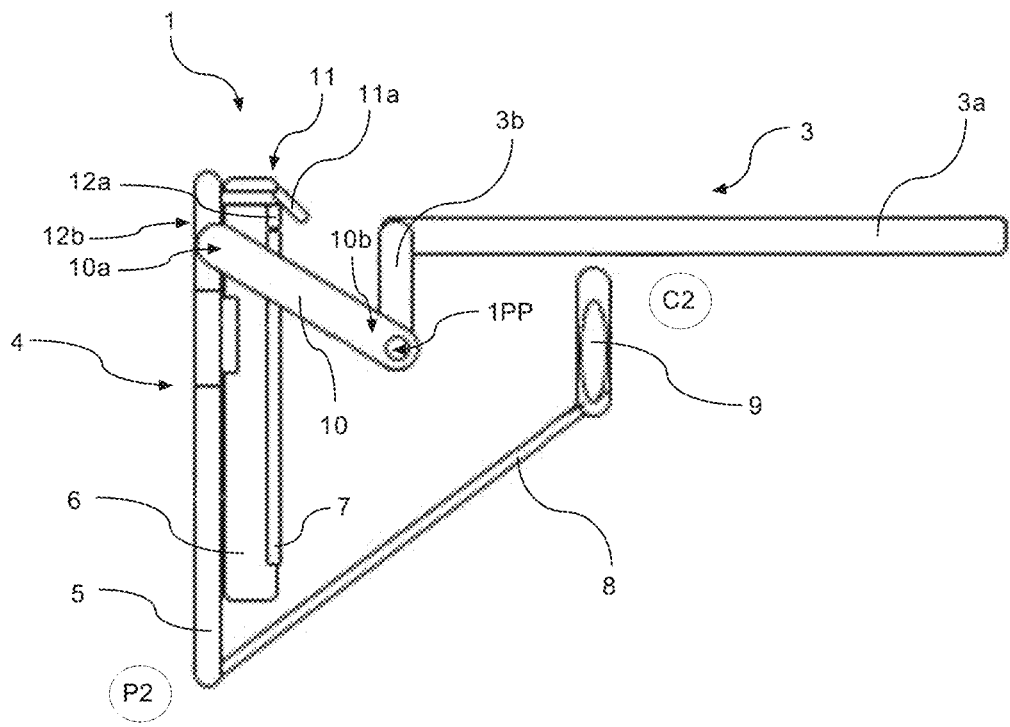
FIG. 5a shows the embodiment of FIGS. 4a to 4c in more detail, said headset being in VR mode.
Figure 7A:
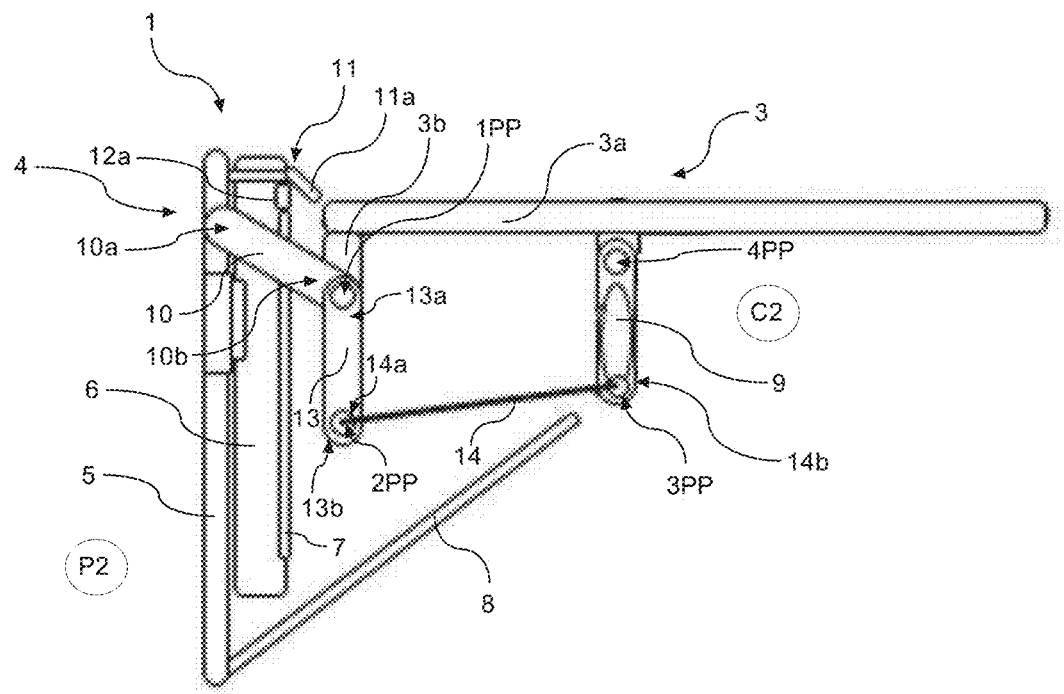
FIG. 7a shows the embodiment of FIGS. 6a to 6c in more detail, said headset being in VR mode.

The pivot frame 4 may further comprise a reflective element 11, see FIGS. 3, 5a, and 7a. The reflective element 11 is adapted for reflecting and guiding light towards the camera 12 of the electronic device 6 and at least along an optical axis of the camera 12, when the electronic device 6 is accommodated in the holder 5, such that the camera can be used to record the surroundings. Light may also be transmitted directly to the camera without the use of reflection. At least one surface 11a of the reflective element extends at an acute angle γ relative the holder 5 and the electronic device 6, see FIG. 2c. The reflective element 11 may comprise a reflective surface 11a, such as a mirror, or a prism, which may be connected to an arm 11b which is releasably or rigidly attached to the holder 5. The arm 11b may be rigid or flexible such that the position of the mirror or prism may be adjusted. In one embodiment, the surface 11a is arranged at approximately a 45° angle to the arm 11b, which arm in turn extends perpendicular to the display screen 7 when the electronic device 6 is accommodated in the holder 5. The reflective element 11, if detachable, may be used with either the front camera 12a or the rear camera 12b of the electronic device 6.

As a result of the reflective surface 11a being tilted in relation to the electronic device 6, and inevitably the camera 12, the camera 12 may record the surroundings within an optical field having an angle (1), see FIG. 3. The surface 11a reflects light travelling from the surroundings towards the surface 11a within the angle (1), and directs it such that it aligns with the optical axis of the camera 12, and subsequently the camera 12 can record an image. By means of the above mentioned 45° tilt of the reflective surface 11a, the optical axis of the camera may be deflected/folded by 90° or more, for example by 90-110°, in order to match the user's field of view a. Hence, the front camera 12a or the rear camera 12b can be used to monitor objects in the surrounding, and the front camera 12a can be used for hand gesture controls.

The first pivot frame position P1 comprises the display screen 7 extending in parallel with the first main frame part 3a, i.e. a position wherein the headset 1 is in the AR mode. The second pivot frame position P2 comprises the display screen 7 extending in parallel with the second main frame part 3b, when the electronic device 6 is accommodated in the holder 5, i.e. a position wherein the headset 1 is in the VR mode. In other words, when a user is seated or standing in an upright position, the display screen 7 extends essentially vertically when the headset 1 is in the VR mode, and essentially horizontally when the headset 1 is in the AR mode.

The pivot frame 4 may comprise a first link 10, one first end 10a of the first link being fixedly connected to the holder 5, and an opposite, second end 10b of the first link being pivotally connected to the main frame 3. The first link 10 may extend from the holder 5 at an acute angle R, in a direction towards the reflective screen 8. See FIGS. 2b and 2c as well as FIGS. 5a and 7a.

The first link 10 may be pivotally connected to the second main frame part 3b. The first link 10 may further be pivotally connected to the second main frame part 3b at a location below the first main frame part 3a when the user is wearing the headset 1.

In one embodiment, the corrective optics 9 is fixedly connected to the reflective screen 8. The corrective optics 9 may extend at an obtuse angle δ from the reflective screen 8, see FIGS. 2c, 5a, and 5b.

This embodiment is shown in the VR mode in FIG. 4a, wherein it is also shown that the field of view a of the user corresponds at least to the area of the display screen 7. I.e., the user can see the entire display screen 7 of the electronic device 6 accommodated in the holder 5, and the surroundings are at least partially closed off from the field of view a of the user, such that the user can focus on what is shown on the display screen 7.

The holder 5, and subsequently the electronic device 6, can be moved by the user by e.g. grabbing the holder 5 and/or electronic device 6 with one or two hands, or by remote controlling the movement of the holder 5 and/or electronic device 6 by means of an electric motor, and moving it in a direction upwards and outwards from the face of the user, i.e. by pivoting the pivot frame 4.

FIG. 4b shows an intermediate position where the headset is in between the VR mode and the AR mode.

Figure 5B:
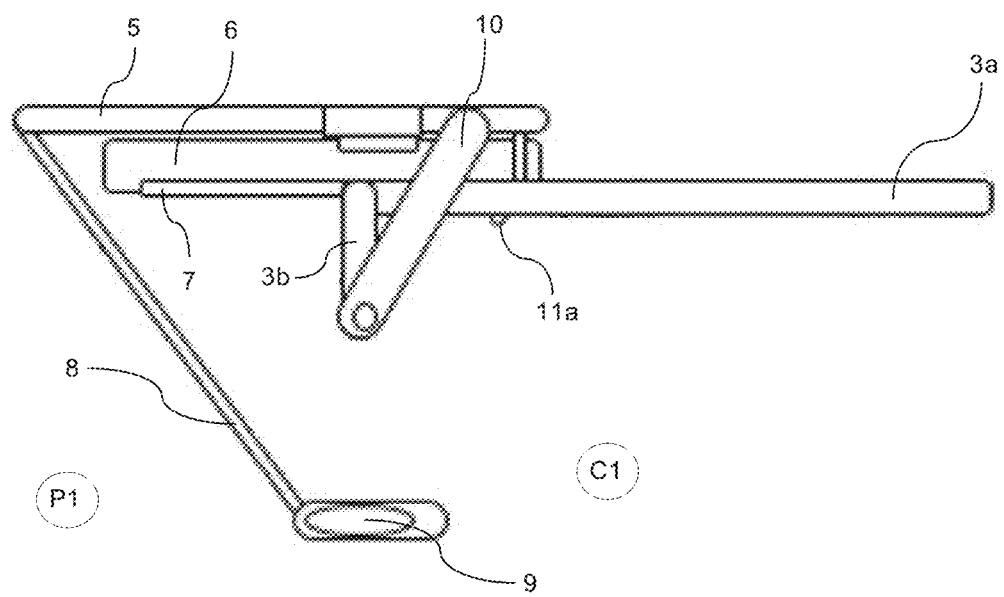
FIG. 5b shows the embodiment of FIG. 5a, said headset being in AR mode.

The holder 5 and the electronic device 6 are pivoted, in relation to the main frame 3, at the pivot point 1PP where the second end 10b of the first link 10 connects to the second main frame part 3b, see FIGS. 5a and 5b.

The pivot point 1PP may be the only pivot point within the headset. However, the headset may be provided with further pivot points such as at the connection between the reflective screen 8 and the corrective optics 9, the connection between the reflective screen 8 and the holder 5, and/or the connection between the holder 5 and the first link 10.

As the holder 5 and the electronic device 6 pivot, the reflective screen 8 and the corrective optics 9 are moved simultaneously. The reflective screen 8 is moved in a direction upwards and outwards from the face of the user and the field of view a of the user. The corrective optics 9, however, is moved in a direction downwards and outwards from the face of the user, moving the corrective optics 9 out from, or at least to the periphery of, the field of view a of the user.

When the holder 5 and the electronic device 6 have been pivoted approximately 90°, the reflective screen 8 is the only component which intersects the field of view a of the user, and hence the headset is in AR mode as shown in FIG. 4c. The content shown on the display screen 7 is reflected onto the reflective screen 8, allowing the user to see both that content and the surroundings at the same time.

The headset is returned, from AR mode to VR mode, by a corresponding, oppositely directed pivoting movement of the holder 5 and the electronic device 6.

Figure 7B:
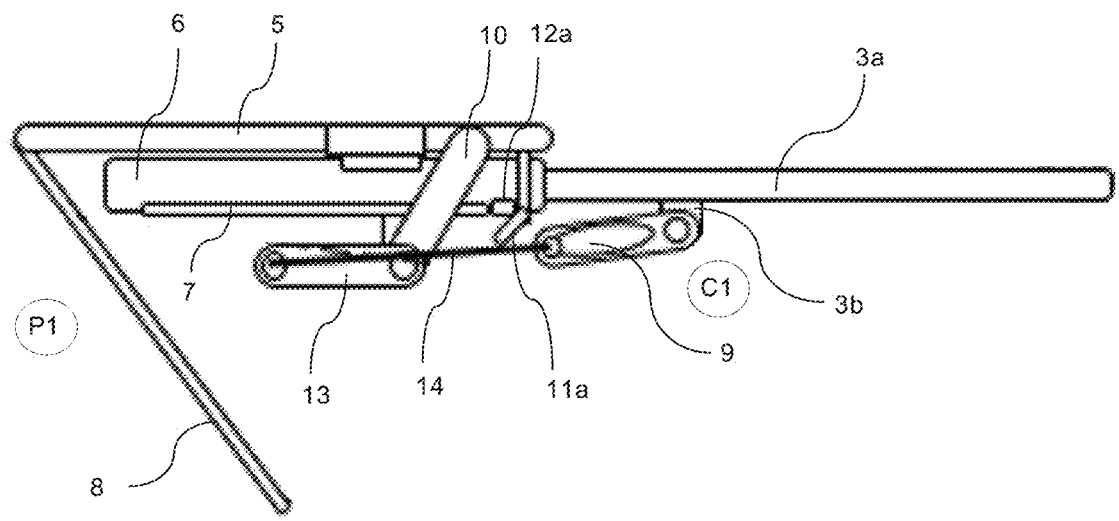
FIG. 7b shows the embodiment of FIG. 7a, said headset being in AR mode.

In a further embodiment, the corrective optics 9 is pivotally connected to the main frame 3, see FIGS. 2b, 7a, and 7b. The corrective optics 9 may be pivotally connected to the first main frame part 3a at a distance from the second main frame part 3b.

The pivot frame 4 may comprise a second link 13 and a connecting rod 14. The first end 13a of the second link is fixedly connected to the second end 10b of the first link 10, such that the first 10 and second 13 links together form a V-shape, the V-shape being open in a direction towards the holder 5. The opposite, second end 13b of the second link 13 is pivotally connected to the first end 14a of the connecting rod, and the opposite, second end 14b of the connecting rod is pivotally connected to the corrective optics 9.

This embodiment is shown in the VR mode in FIG. 6a, wherein it is also shown that the field of view a of the user corresponds at least to the area of the display screen 7. I.e., the user can see the entire display screen 7 of the electronic device 6 accommodated in the holder 5, and the surroundings are closed off from the field of view a of the user, such that the user can focus on what is shown on the display screen 7.

The holder 5, and subsequently the electronic device 6, may be moved by the user by e.g. grabbing the holder 5 and/or electronic device 6 with one or two hands, or by remote controlling the movement of the holder 5 and/or electronic device 6 by means of an electric motor, and moving it in a direction upwards and outwards from the face of the user, i.e. by pivoting the pivot frame 4.

FIG. 6b shows an intermediate position where the headset is in between the VR mode and the AR mode.

The holder 5 and the electronic device 6 are pivoted, in relation to the main frame 3, at the pivot point 1PP where the second end 10b of the first link 10 connects to the second main frame part 3b and the first end 13a of the second link 13, see FIGS. 7a and 7b. Both the first link 10 and the second link 13 are pivoted at this pivot point 1PP, simultaneously.

As the second link 13 pivots, the second end 13b of the second link 13 moves in a direction upwards and outwards from the face of the user. Since the first end 14a of the connecting rod is pivotally connected to the second end 13b of the second link 13, at pivot point 2PP, the connecting rod 14 is also moved in a direction upwards and outwards from the face of the user. The opposite, second end 14b of the connecting rod is pivotally connected to the corrective optics 9 at a pivot point 3PP, wherefore the pivoting motion of the second link 13 and the subsequent movement of the connecting rod 14, is translated to movement of the corrective optics 9. The corrective optics 9 are, preferably at one of its ends, pivotally connected to the first main frame part 3a at pivot point 4PP. This, in turn, leads to the corrective optics 9 being pivoted in a direction upwards and outwards from the face of the user, out from, or at least to the periphery of, the field of view a of the user. The headset 1 may be provided with further pivot points such as at the connection between the reflective screen 8 and the corrective optics 9, the connection between the reflective screen 8 and the holder 5, and/or the connection between the holder 5 and the first link 10.

As the holder 5 and the electronic device 6 pivot, the reflective screen 8 moves simultaneously. The reflective screen 8 is moved in a direction upwards and outwards from the face of the user such that it, in a final position, extends essentially in parallel with, and adjacent to, the first main frame part 3a.

When the holder 5 and the electronic device 6 have been pivoted approximately 90°, the reflective screen 8 is the only component which intersects the field of view a of the user, and hence the headset is in AR mode as shown in FIG. 6c. The content shown on the display screen 7 is reflected onto the reflective screen 8, allowing the user to see both this content and the surroundings at the same time.

The headset is returned, from AR mode to VR mode, by a corresponding, oppositely directed pivoting movement of the holder 5 and the electronic device 6.

The various aspects and implementations has been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

The invention claimed is:

1. A dual mode virtual reality (VR) and augmented reality (AR) headset, comprising:
   a head-attachment;
   a main frame coupled to the head-attachment;
   a pivot frame, comprising:
      a holder configured to accommodate an electronic device having a display screen;
      a reflective screen configured to reflect content shown on the display screen;
      a reflective element, wherein the reflective element is configured to reflect light along an optical axis of a camera of the electronic device when the electronic device is accommodated in the holder, and wherein the reflective element comprises at least one surface extending at a first acute angle relative to the holder;
      a first link, wherein a first end of the first link is fixedly coupled to the holder, and wherein a second end of the first link is pivotally coupled to the main frame;
      a second link; and
      a connecting rod, wherein a first end of the second link is fixedly coupled to the first link to form a V-shape, wherein the V-shape is open in a direction towards the holder, wherein a second end of the second link is pivotally coupled to a first end of the connecting rod,
   wherein the pivot frame is pivotally coupled to the main frame to allow the pivot frame to be moved between a first pivot frame position and a second pivot frame position relative to the main frame,
   wherein in the first pivot frame position, the reflective screen is configured to at least partially intersect a field of view of a user wearing the dual mode VR and the AR headset, and
   wherein in the second pivot frame position, the display screen is further configured to at least partially intersect the field of view when the electronic device is accommodated in the holder; and
   corrective optics pivotally coupled to the pivot frame, wherein the corrective optics are configured to move to a first position relative to the main frame when the pivot frame moves to the first pivot frame position, and wherein a second end of the connecting rod is pivotally coupled to the corrective optics.

2. The dual mode VR and AR headset of claim 1, wherein in the first pivot frame position the display screen is further configured to not intersect the field of view when the electronic device is accommodated in the holder.

3. The dual mode VR and AR headset of claim 1, wherein the corrective optics are further configured to at least partially intersect the field of view when the pivot frame is in the second pivot frame position.

4. The dual mode VR and AR headset of claim 1, wherein the first link extends from the holder at an acute angle.

5. The dual mode VR and AR headset of claim 1, wherein the reflective screen is partially curved.

6. The dual mode VR and AR headset of claim 1, wherein the corrective optics are fixedly coupled to the reflective screen.

7. The dual mode VR and AR headset of claim 6, wherein the corrective optics are configured to extend from the reflective screen at an obtuse angle.

8. The dual mode VR and AR headset of claim 1, wherein the main frame comprises:
   a first main frame part configured to extend perpendicular to a face of the user; and
   a second main frame part configured to extend in parallel with the face of the user, wherein the first link is pivotally coupled to the second main frame part.

9. The dual mode VR and AR headset of claim 8, wherein when the electronic device is accommodated in the holder in the first pivot frame position, the display screen is configured to extend in parallel with the first main frame.

10. The dual mode VR and AR headset of claim 8, wherein the first link is pivotally coupled to the second main frame part at a location below the first main frame part when the user wears the headset.

11. The dual mode VR and AR headset of claim 10, wherein the corrective optics are pivotally coupled to the first main frame part at a distance from the second main frame part.

12. The dual mode VR and AR headset of claim 11, wherein the reflective screen is configured to extend from the holder at a second acute angle.

13. The dual mode VR and AR headset of claim 8, wherein when the electronic device is accommodated in the holder in the second pivot frame position, the display screen is configured to extend in parallel with the second main frame part.

14. The dual mode VR and AR headset of claim 1, wherein the corrective optics are further configured to move to a second position relative to the main frame when the pivot frame moves to the second pivot frame position.

15. A dual mode virtual reality (VR) and augmented reality (AR) headset, comprising:
   a head-attachment;
   a main frame coupled to the head-attachment; and
   a pivot frame pivotally coupled to the main frame to allow the pivot frame to be moved between a first pivot frame position corresponding to an AR mode and a second pivot frame position corresponding to a VR mode, the pivot frame comprising:
      a holder configured to detachably accommodate an electronic device having a display screen; and
      a reflective screen configured to reflect content shown on the display screen and fixedly coupled to the holder such that an angle between the reflective screen and the holder is the same when the pivot frame is in the first pivot frame position as when the pivot frame is in the second frame position,
   wherein in the first pivot frame position, the reflective screen is configured to at least partially intersect a field of view of a user wearing the dual mode VR and the AR headset, and
   wherein in the second pivot frame position, the display screen is further configured to at least partially intersect the field of view when the electronic device is accommodated in the holder.

16. The dual mode VR and AR headset of claim 15, wherein in the first pivot frame position the display screen is further configured to not intersect the field of view when the electronic device is accommodated in the holder.

17. A dual mode virtual reality (VR) and augmented reality (AR) headset, comprising:
a head-attachment;
a main frame coupled to the head-attachment;
a pivot frame pivotally coupled to the main frame to allow the pivot frame to be moved between a first pivot frame position corresponding to an AR mode and a second pivot frame position corresponding to a VR mode, the pivot frame comprising:
a holder configured to detachably accommodate an electronic device having a display screen; and
a reflective screen coupled to the holder at a first end of the reflective screen and configured to reflect content shown on the display screen,
wherein in the first pivot frame position, the reflective screen is configured to at least partially intersect a field of view of a user wearing the dual mode VR and the AR headset, and
wherein in the second pivot frame position, the display screen is further configured to at least partially intersect the field of view when the electronic device is accommodated in the holder; and
corrective optics coupled to the reflective screen at a second end of the reflective screen, wherein the second end is opposite the first end.

18. The dual mode VR and AR headset of claim 17, wherein in the first pivot frame position the display screen is further configured to not intersect the field of view when the electronic device is accommodated in the holder.

19. The dual mode VR and AR headset of claim 17, wherein the corrective optics are further configured to at least partially intersect the field of view when the pivot frame is in the second pivot frame position.

* * * * *